S. G. LEWIS.

SUPPORT FOR TIMEPIECES.

APPLICATION FILED AUG. 25, 1916.

Reissued Dec. 12, 1916. 14,232.

WITNESSES

J. Herbert Bradley.

Francis J. Donovan.

INVENTOR

Seneca J. Lewis by Chilly and Chilly his attorneys.

THE NORRIS PETERS CO., PHOTO-LITHO., WASHINGTON, D. C.

UNITED STATES PATENT OFFICE.

SENECA G. LEWIS, OF GREENSBURG, PENNSYLVANIA, ASSIGNOR OF ONE-HALF TO GEORGE W. DAUM, OF JEANNETTE, PENNSYLVANIA.

SUPPORT FOR TIMEPIECES.

14,232. Specification of Reissued Letters Patent. Reissued Dec. 12, 1916.

Original No. 1,176,839, dated March 28, 1916, Serial No. 34,805, filed June 18, 1915. Application for reissue filed August 25, 1916. Serial No. 116,941.

*To all whom it may concern:*

Be it known that I, SENECA G. LEWIS, residing at Greensburg, in the county of Westmoreland and State of Pennsylvania, a citizen of the United States, have invented or discovered certain new and useful Improvements in Supports for Timepieces, of which improvements the following is a specification.

My invention relates to improvements in supports for timepieces. It finds practical application in the mounting of a watch on the body of an automobile.

Figure 1:
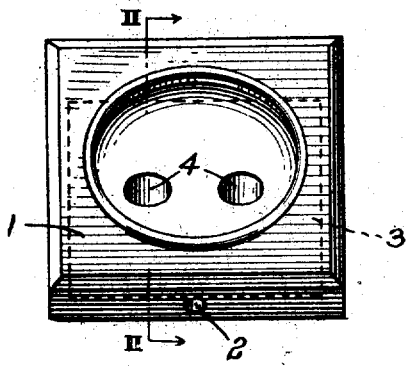
Figure 2:
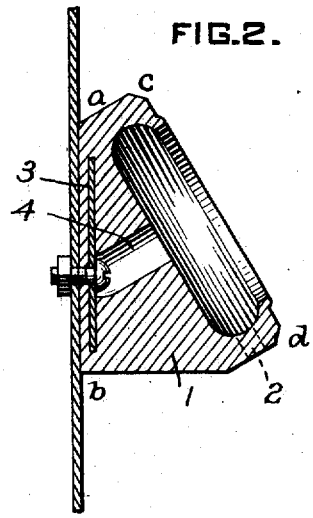
Figure 3:
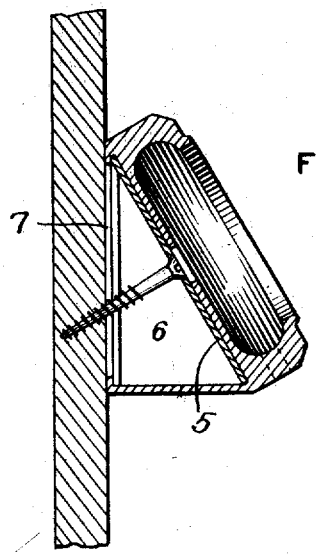

In the accompanying drawings which form part of this specification Figure 1 is a view in front elevation of a watch support for an automobile which embodies my invention; Fig. 2 is a view in vertical section of the same article, the plane of section being indicated by the line II—II, Fig. 1. Fig. 3 is a view similar to Fig. 2, illustrating a modification in structure.

The support of my invention consists of a block of rubber 1 of which one face, *a—b*, is shaped to engage the supporting surface—which ordinarily will be the flat vertical face of the dash-board of an automobile—and the other face, *c—d*, is shaped to form a pocket to receive and retain a watch, leaving the dial exposed to view. The shape of this pocket is sufficiently indicated in Figs. 1 and 2 of the drawings. A flange surrounds the watch and overlaps its edge; a hole 2 through this flange is provided for the passing through of the stem of the watch. The proportions and material are such that the pocket may be stretched to permit the insertion and removal of the watch; but when the watch is in place it will be securely held. The hole 2 in the flange allows the introduction through it of the winding stem of the watch; and when by the stretching of the material the winding knob has passed through the hole 2, the edges of the hole will close around and make firm and dust-proof engagement about the stem and beneath the winding knob. The winding knob will remain accessible for winding.

The faces *a—b* and *c—d* of block 1 are so disposed one to the other that when the support is in place and a watch carried in the support the face of the watch will be turned toward the occupant of a seat in the automobile. Ordinarily, as I have said, the support will be applied to the substantially vertical inner face of the dash-board of the automobile, and ordinarily the face *c—d* with its watch pocket will be opposite the face *a—b* and inclined to the face *a—b*, as is indicated in Fig. 2.

The rubber block 1 is secured in place against a suitable surface on the body of the automobile. Embedded within the substance of block 1 is an inlay of rigid material. This may conveniently take the form of a metal plate 3. Preferably, this inlay is arranged wholly within the body of rubber. Through it the structure is secured to the body of the automobile, by bolts, screws, or the like. In Fig. 2 I have shown bolts securing the support to the automobile body. The holes for the passage of the bolts are formed through plate 3 and through the adjacent portions of the body of rubber. The holes for applying the bolts are preferably enlarged as at 4 that the heads may be countersunk, and in the arrangement shown these holes open through the pocket formed for receiving the watch.

When the support has been applied, as indicated in Fig. 2, it is to be observed that there is a cushioning layer of rubber interposed between the inlay 3 and the automobile body to which the support is attached; it is further to be observed that the watch when applied and carried in its pocket rests entirely within a body of rubber, bearing neither upon the inlay 3 nor upon the heads of the retaining screws; it is further to be observed that the elasticity of the entire block of rubber is made available to cushion the contained watch against shock and jar; and finally it is to be observed of the structure as shown that when the watch is in place in its pocket the means of supporting the structure are entirely concealed, so that the whole presents a simple and neat appearance.

The variation in structure illustrated in Fig. 3 concerns the inlay of rigid material. This takes the form of a frame of sheet steel composed of three webs—a medial web 5, and opposite end webs 6. This frame rests in a suitable recess formed in the body of the support. When the support is applied and secured in place a lip 7 of rubber is clamped between the edges of the frame and the face against which the support is applied. The securing (as shown in this instance it is by screws) is through the medial web 5. As in the other form the securing means are counter sunk in holes extending from the back of the watch pocket.

Comparing Figs. 1 and 2, it will be observed that with the opposite faces *a—b* and *c—d* of block 1 disposed at an angle one to another such as is indicated—and this will be the usual angle—the stem of the watch will conveniently protrude through the lower edge of the support, and, accordingly, the dial of the watch will conveniently be inverted from the position usual in open faced watches. Of course, the stem will protrude where most convenient.

Manifestly the structure without the attaching screws or the like—and therefore without the necessary presence of the inlay 3 and the screw holes—may be made a convenient and ornamental support for a desk watch. In such use the edge which as shown in the drawings is the lower edge will become the higher edge, the stem of the watch will protrude at the top, and the dial will be normal, not inverted.

The convenience of having a watch permanently mounted on an automobile body where it is under the eye of the driver has heretofore been greatly diminished because of the fact that the jolts and jars of service tend to injure the watch and make it unreliable and useless as a timekeeper. It is to the overcoming of this difficulty that my invention is primarily addressed. Furthermore, since rubber is a nonconductor of electricity, the watch in its pocket is effectively insulated against electrical or magnetic disturbance.

As distinguished from other articles serving the same general ends, my support made of elastic material is a one-piece article. Other supports require for insertion of the watch the separation and putting together again of a plurality of interconnecting parts; my support, because of its material and shape, requires no such taking apart and putting together. Thus it is serviceable and may be used with greatest ease, and, furthermore, it presents a simple and attractive appearance.

It will be observed that, when the watch is applied, the inturned flange which forms the rim of the watch pocket is stretched and the hole 2 formed through the flange is enlarged to permit the introduction of the watch; and then, when the watch is in place and the rubber contracts around it, it is held firmly in a substantially dust-proof pocket.

Manifestly the invention is applicable in any case where a timepiece in its mounting is liable to injury by jolts and jars imparted from the body in which it is mounted.

I claim as my invention:

1. A support for a timepiece consisting of a body of elastic material, a pocket in one face of said body, and an inlay of rigid material arranged wholly within said body.

2. A support for a timepiece consisting of a body of elastic material, said body provided on one face with an annular flange formed also of elastic material and of one substance with said body and forming with said body a watch-pocket, and an inlay of rigid material within said body, such support being provided with a securing hole extending through the elastic material and through the inlay within it.

3. A support for a timepiece consisting of a body of elastic material, a pocket in one face of said body and of one substance with said body, and an inlay of rigid material within said body, said structure being provided with a securing hole extending from said pocket through said body of elastic material and through said inlay of rigid material within it.

4. A support for a timepiece consisting of a body of elastic material provided on one face with an annular flange formed also of elastic material and of one substance with said body and forming with said body a pocket for a timepiece, said flange being provided with a watch stem engaging orifice normally engaging (when the watch is in place) the stem of the watch beneath the winding knob.

5. A support for a timepiece consisting of a body of elastic material provided on one face with a pocket, and expansible and contractible to permit the insertion, secure retention, and removal of a timepiece, said pocket being closed over the back of an introduced timepiece and having two openings; the one exposing the face and the other exposing the winding means of an introduced timepiece.

In testimony whereof I have hereunto set my hand this 19th day of August, A. D., 1916.

SENECA G. LEWIS.

Witnesses:
ALICE A. TRILL,
BAYARD H. CHRISTY.

Copies of this patent may be obtained for five cents each, by addressing the "Commissioner of Patents, Washington, D. C."